QUICK-CHANGE MOUNTING FOR WATER-COOLED MOLD

Original Filed Oct. 15, 1964 5 Sheets-Sheet 1

INVENTOR.
CHARLES H. BODE, JR
BY Donald G. Dalton
ATTORNEY

QUICK-CHANGE MOUNTING FOR WATER-COOLED MOLD

Original Filed Oct. 15, 1964 5 Sheets-Sheet 2

INVENTOR.
CHARLES H. BODE, JR.
BY Donald G. Dalton
ATTORNEY

QUICK-CHANGE MOUNTING FOR WATER-COOLED MOLD

Original Filed Oct. 15, 1964 5 Sheets-Sheet 3

INVENTOR
CHARLES H. BODE, JR.
BY Donald G. Dalton
ATTORNEY

QUICK-CHANGE MOUNTING FOR WATER-COOLED MOLD

Original Filed Oct. 15, 1964 5 Sheets-Sheet 4

INVENTOR.
CHARLES H. BODE, JR.
BY Donald G. Dalton
ATTORNEY

QUICK-CHANGE MOUNTING FOR WATER-COOLED MOLD

Original Filed Oct. 15, 1964 5 Sheets-Sheet 5

INVENTOR.
CHARLES H. BODE, JR.
BY Donald G. Dalton
ATTORNEY

United States Patent Office

Re. 27,469
Reissued Sept. 5, 1972

27,469
QUICK-CHANGE MOUNTING FOR WATER-COOLED MOLD

Charles H. Bode, Jr., Upper St. Clair Township, Allegheny County, Pa., assignor to United States Steel Corporation Original No. 3,381,743, dated May 7, 1968, Ser. No. 404,002, Oct. 15, 1964. Application for reissue May 4, 1970, Ser. No. 34,663
Int. Cl. B22d *11/00, 27/08*
U.S. Cl. 164—283 8 Claims

Matter enclosed in heavy brackets [ ] appears in the original patent but forms no part of this reissue specification; matter printed in italics indicates the additions made by reissue.

ABSTRACT OF THE DISCLOSURE

A continuous-casting mold is mounted in a vertically reciprocating horizontal rectangular frame. On each of two opposite sides of the frame, separable cooling-water manifolds are mounted, one on the other, with self-acting make-and-break connections therebetween. The mold is secured within the frame to beams bridging the upper manifolds. Piping conducts water from the upper manifolds to and from water-cooling passages in the mold. Flexible hose connected to the lower manifold provides for a supply of cooling water thereto and its return. On lifting the beams, and the upper mold-supporting manifolds, the self-acting connections are broken.

This invention relates to mountings for molds used for the continuous casting of molten metals such as steel.

To start the casting operation, the molten metal is poured into the upper end of a tubular reciprocating mold to a predetermined level while the lower end is closed by a removable plug called a start bar. After initial solidification the casting is started downwardly under the control pinch rolls engaging the starter bar. The equipment for mounting the mold, called an oscillator frame, includes stationary and movable members, the latter being adapted to be raised and lowered periodically, and cooling water for the mold must be conducted through flexible hoses from stationary headers or the like. Heretofore, these hoses have been connected by couplings requiring manual making and breaking whenever the mold in use is to be removed and replaced by another and the labor involved causes delays and inconvenience.

Delays in changing a mold not only cause the continuous-casting apparatus to stand idle; they also cause dislocations in other operating areas of the mill of which the continuous-casting apparatus is a part.

The object of the present invention is to eliminate this problem of coupling manipulation by workmen, so that mold-change time is reduced.

To disclose the principles of my invention, a specific example of a quick-change mounting for a continuous-casting mold is disclosed in the accompanying drawings.

Figure 1:
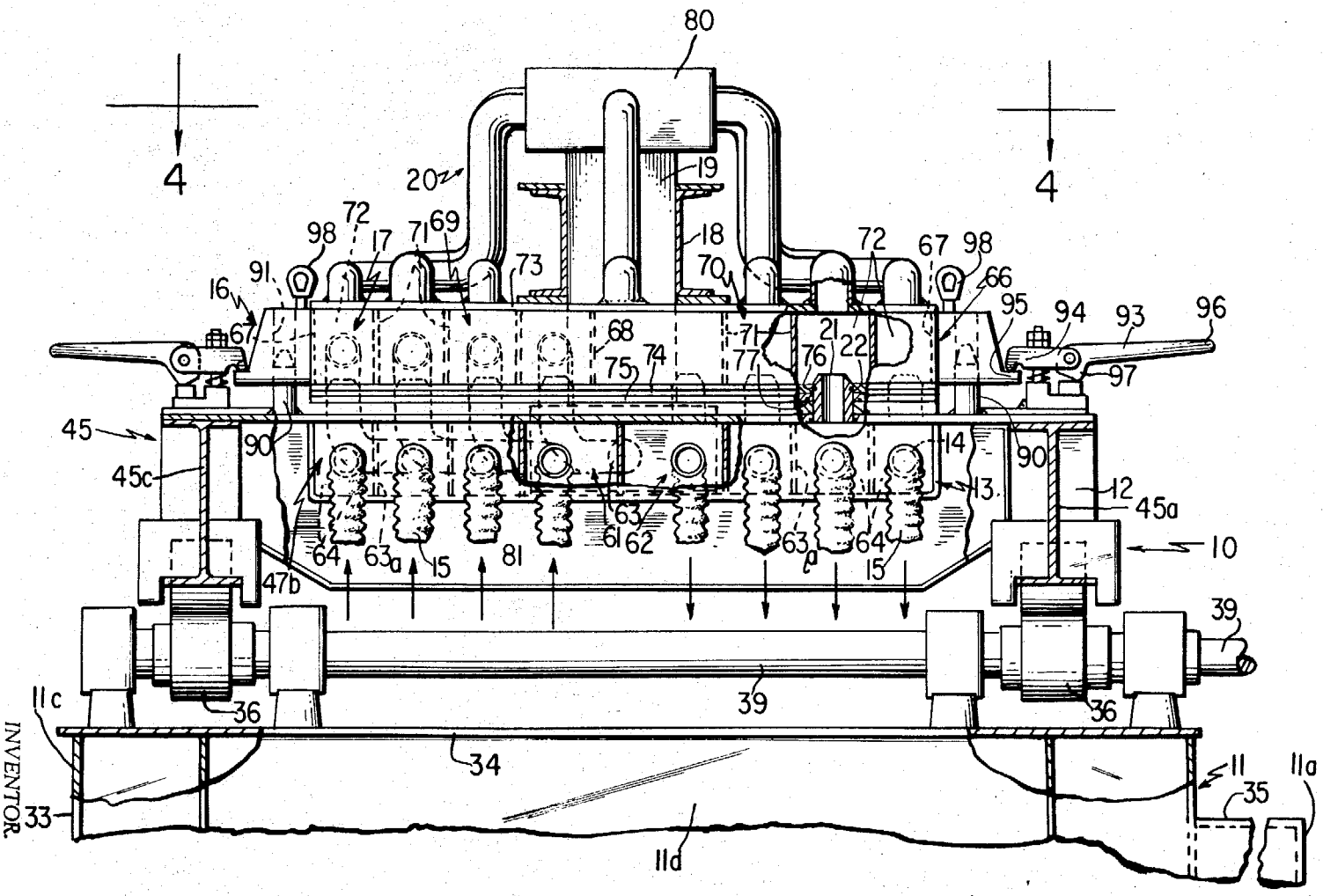
FIG. 1 is a side elevation, with parts broken away and parts in section, of my quick-change mounting.
Figure 2:
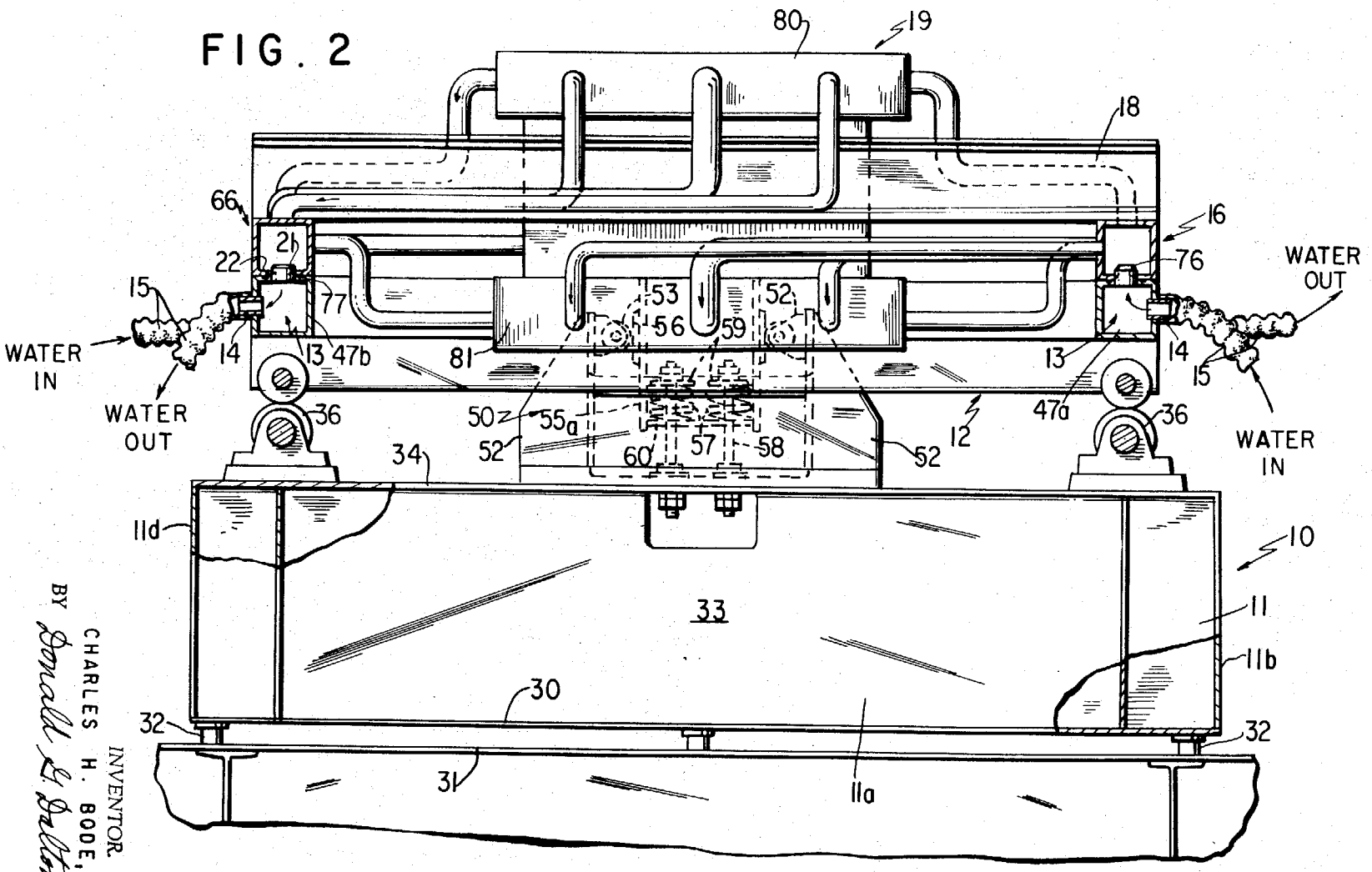
FIG. 2 is a front elevation, with parts broken away and parts shown in section.
Figure 3:
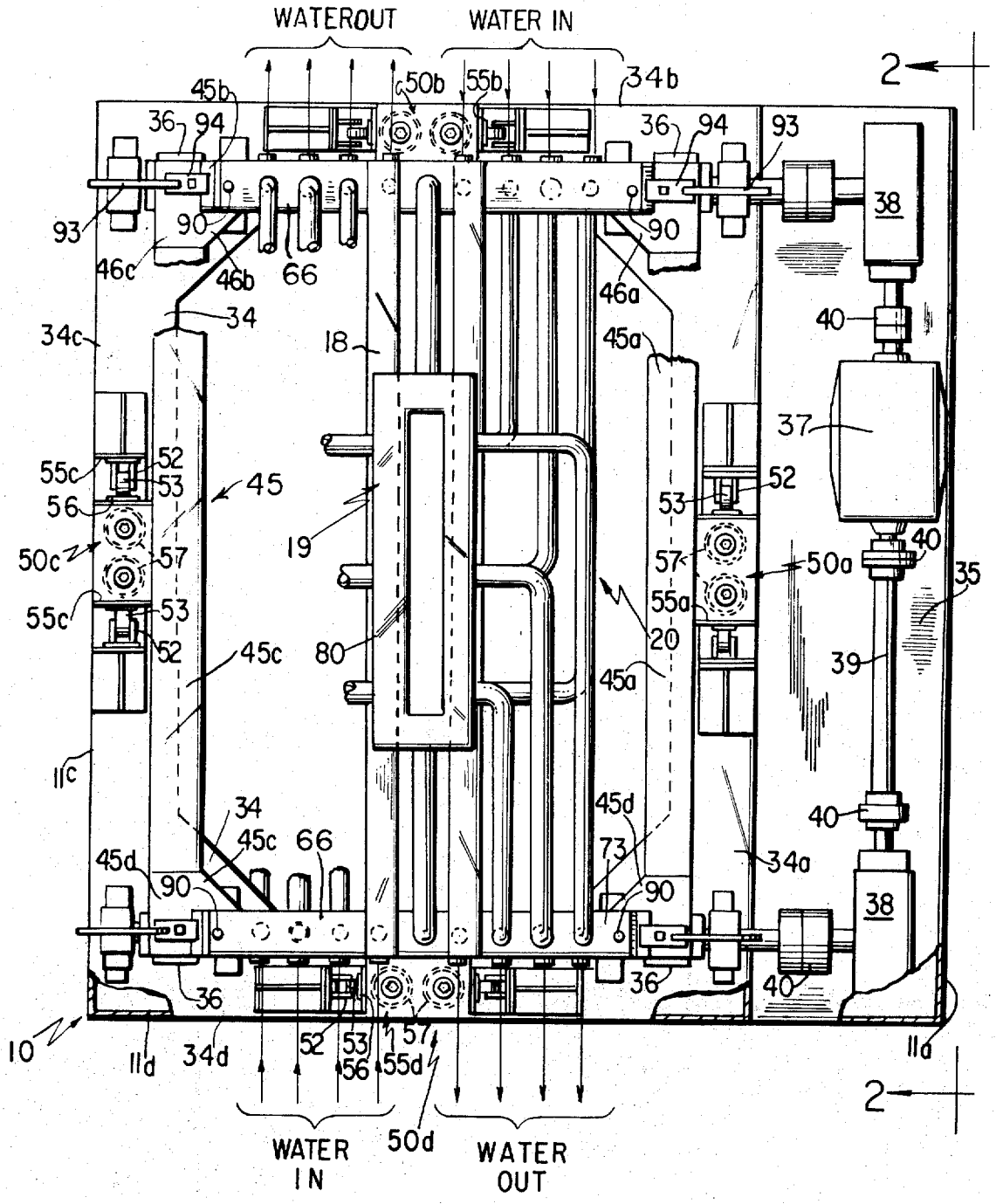
FIG. 3 is a top plan view, with parts broken away.

Referring now to FIGS. 1 to 3 and especially to FIG. 1, the quick-change mounting of my invention includes a mold oscillator frame, indicated generally at 10, and comprising a base 11 and a vertically reciprocable upper-portion 12. The latter includes liquid-conducting portions 13 or manifolds having connections 14 for flexible hoses 15.

My mounting includes a mold-support frame 16 removably positioned on the upper portion 12 and having liquid-conducting portions of manifolds 17 located to register with the *liquid conducting* portions 13. This frame 16 has cross beams 18 which support the vertical open-ended tubular mold 19. Conduits 20, which may be rigid pipes, connect the liquid-conducting portions 17 of the mold support frame 16 with the upper and lower ends of the mold 19.

The liquid-conducting portions 13 of frame 10 are connected to the liquid-conducting portions 17 of the mold-support frame 16, by mutually registering separable liquid connections which include upwardly extending nipples 21 integral with the upper portion 12 of mold-oscillator frame 10, and openings 22 or nipple sockets therefor in frame 16.

The base 11 of frame 10 is a four-sided structure which has the shape of an open rectangle as seen in plan view. The four sides thereof include two opposite sides 11a and 11c which are parallel to the face walls of the molds 19 and the other two sides 11b and 11d which are parallel to the edge walls of mold 19. Sides 11b, 11c and 11d are of equal width while side 11a is wider to support a motor and an associated drive mechanism.

Base 11 has a bottom 30 secured to a suitable supporting structure, such as floor 31 (shown in FIG. 2). Base 11 has vertical walls 33 which extend upwardly from the edges of bottom 30 and support horizontal platforms 34 and 35. Platform 34 is a four-sided structure having sides 34a, 34b, 34c, and 34d of equal width arranged in the form of an open rectangle as seen in plan view. Sides 34b, 34c, and 34d overlie sides 11b, 11c and 11d respectively of base 11. Platform 35 is a rectangular structure at a slightly lower elevation than platform 34 and lying adjacent to side 34a thereof.

The upper portion 12 of frame 10 is reciprocated upwardly and downwardly by means of cams 36 driven by motor 37 through a drive system which includes a pair of bevel gears 38 as well as the necessary shafts 39 and couplings 40. Cams 36 are supported by platform 34 at each of the four corners thereof. Motor 37 and bevel gears 38 are supported on platform 35. Details of drive mechanisms of this sort are known and will therefore not be further described here.

The upper portion 12 of frame 10 comprises a rectangle 45 made up of four I-beam lengths 45a, 45b, 45c, and 45d joined together at their ends. Rectangle 45 rides on cams [46] *36*. The I-beam lengths 45a, 45b, 45c, and 45d are located directly above sides 34a, 34b, 34c, and 34d respectively of platform 34. The I-beam lengths are narrower than the platform sides and are aligned so that the inner edge of each I-beam length lies substantially directly above the corresponding inner edge of platform 34. The I-beam lengths 45a, 45b, 45c and 45d are joined together at their ends by corner pieces 46a, 46b, 46c, and 46d.

Portions of I-beam lengths 45b and 45d are cut away to provide space for liquid-conducting portions 13 of frame 10. These portions 13 are formed by rectangular metal tubes 47a and 47b welded to I-beams 45b and 45d.

The reciprocable portion 12 of oscillator frame 10 is guided for vertical motion by means of a plurality of guide roller mechanisms 50, 50a, 50b, 50c, and 50d, which are identical in construction and are mounted on the four sides 34a, 34b, 34c, and 34d respectively of platform 34 and on the corresponding sides 45a, 45b, 45c, and 45d respectively of rectangle 45. Each of the guide oller mechanisms 50a, 50b, 50c, and 50d comprises a pair of guide brackets 52 secured to the platform 34, rollers 53 on guide brackets 52, a pair of vertical guide strips 55a, 55b, 55c, and 55d welded to the adjacent I-beam engths 45a, 45b, 45c and 45d, respectively, and having wear surfaces 56 thereon for contact with rollers 53. The guide strips 55b and 55d are also welded to tubes 47a and 47b respectively of liquid-conducting portions 13. Compression springs 57 are provided for resisting the upward movement of the portion 12 of the frame 10. The mountings for compression springs 57 include studs 58 having screw-threaded ends, the lower one fixedly engaging the base 11 of the frame 10 and the upper one carrying a washer 59 for springs 57. The vertical guides 55 also carry a plate 60 at the lower end thereof, which has holes to permit free passage of shafts 58 therethrough and which serve as bearings for springs 57. Thus springs 57 are confined between abutments 59 and 60, and are compressed by the upstroke of portion 12 of frame 10, and expand on the downstroke. A pair of compression springs 57 is located along each of the four sides of frame 10.

The space in each of the two liquid-conducting portions 13 is divided by a vertical partition 63 into an inlet section 61 and an outlet section 62 of about equal size. The inlet sections 61 receive cooling water from fixed headers (not shown), and the outlet sections 62 return cooling water to similar fixed headers (not shown). Vertical partitions 63a divide each of the inlet and outlet sections in liquid-conducting portions 13 into a plurality of chambers 64 (eight in each liquid-conducting portion 13 are shown in the drawings herein), and the hose connections 14, one for each chamber 64, extend outwardly from the side walls of tubes 47a and 47b. Openings in these tubes 47a and 47b provide fluid communication between liquid-conducting portion 13 and the fixed headers (not shown) through hose connections 14 and flexible hoses 15.

A plurality of the nipples 21 extend upwardly from openings in the top walls of tubes 47a and 47b and provide fluid communication between liquid-conducting portions 13 of frame 10 and liquid-conducting portions 17 of frame 16. One nipple extends from each of the chambers 64 in liquid-conducting portions 13.

Frame 16 includes spaced metal tubes 66 between which extend a pair of beams 18 welded thereto. Tubes 66 rest on I-beams 45b and 45d respectively when mold support frame 16 is in metal casting position on mold oscillator frame 10. Beams 18 extend longitudinally of the casting and are welded to the exterior walls of mold 19. Liquid-conducting portions 17 occupy all of tubes 66 except for the ends. Partitions 67 separate the liquid-conducting portions 17 from the ends. The two liquid-conducting portions 17 of frame 16 lie directly above the liquid-conducting portions 13 of frame 10 when frame 16 is resting on frame 10.

The liquid conducting portions 17 of frame 10 are each divided into two sections of approximately the same size by internal partition 68. One of these sections 69 serves as an inlet for cooling water from the sections 61 of liquid-conducting portions 13 of frame 10, and the other section 70 serves as a return section to receive water from mold 19. Each of these two sections is subdivided by partitions 71 into a plurality of chambers 72, each one of which is in communication with one of the chambers 64 in liquid-conducting portions 13 of the frame 10 through conduit 20.

Each of the tubes 66 has a reinforcing plate 73 above the liquid-conducting portion 17 therein and a pair of reinforcing plates 74 and 75 below it. Plates 74 and 75 provide reinforcement in the area of contact between frame 10 and mold support frame 16. These reinforcing plates extend beyond tubes 66 to form a flange, are bolted together, and are spaced apart by a thin layer of elastomeric sealing material.

Reinforcing plates 74 and 75 have openings 22 therein which register with nipples 21, to provide fluid communication between the liquid-conducting portions 13 and 17 of mold frame 10 and frame 16 respectively. A fluid-tight seal preventing escape of cooling water is provided by O-rings 76 in a recess in the exterior of nipples 21 and in contact with the internal wall constituting opening 22 in tube 66. An additional O-ring 77 is preferably located in a recess in the upper walls of tubes 47a and 47b to provide sealing engagement between the tube walls and plate 75.

Figure 4:
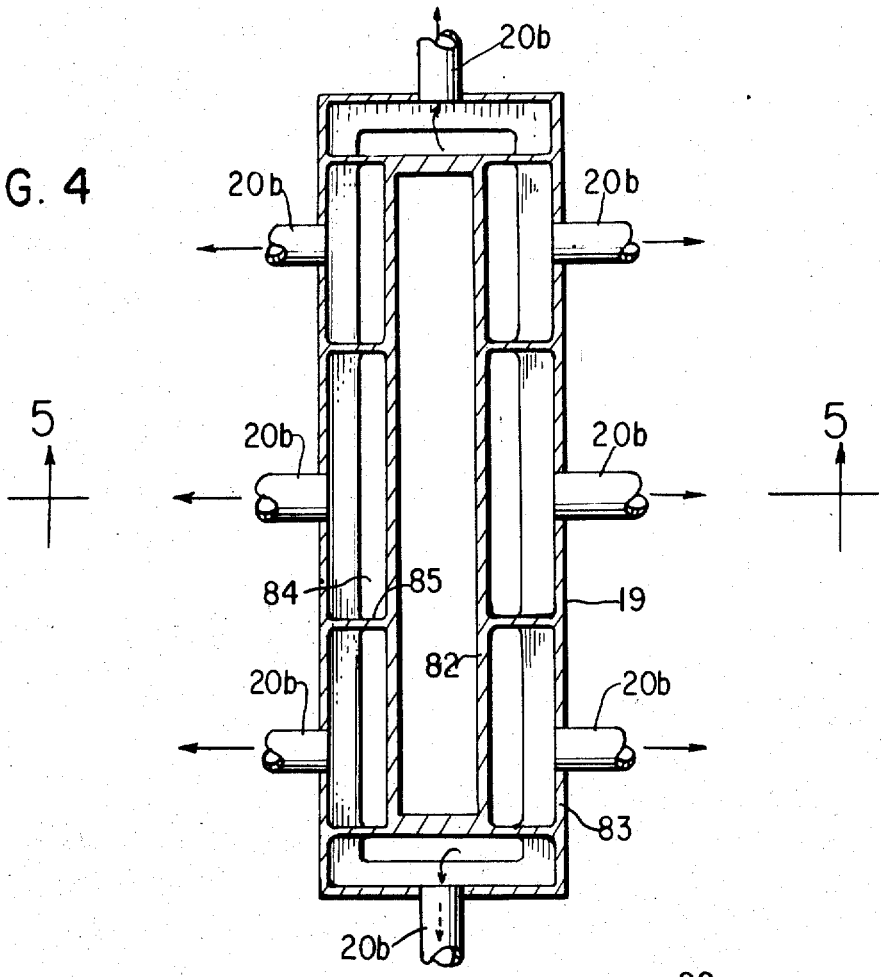
FIG. 4 is a horizontal cross section taken on line 4—4 in FIG. 1.
Figure 5:
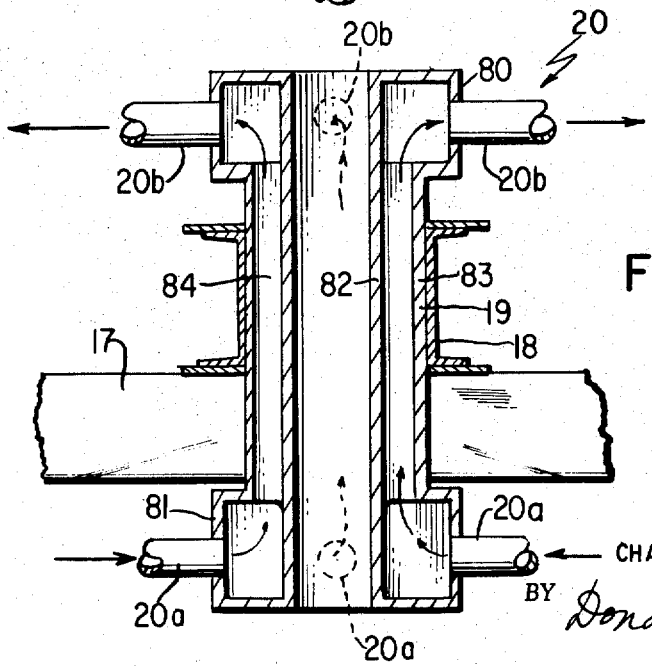
FIG. 5 is a vertical section taken on the line 5—5 in FIG. 4.

Referring now to FIGS. 4 and 5, mold 19 includes a pair of flanges 80 and 81 at the upper and lower ends thereof respectively. Cooling water flows upwardly through mold 19 from lower flange 81 to upper flange 80. Piping indicated generally at 20 includes a plurality of conduits 20a connecting lower flange 81 with the inlet sections 69 of liquid-conducting portions 17 in frame 16. These do not need to be disconnected during mold changes. A plurality of conduits 20b of similar structure connect the upper flange 80 with the outlet sections 70 of liquid-conducting portions 17. Conduits 20a extend from the side walls of liquid-conducting portions 17, while conduits 20b extend from the upper walls of liquid-conducting portions 17.

Mold 19 comprises inner and outer walls 82 and 83 respectively defining cooling passages therebetween. The inner walls 82 define the shape of the casting and separate the casting from the cooling chambers in mold 19. The outer walls 83 define the exterior of mold 19 and serve as the walls to which beams 18 are attached. As will be seen in FIG. 4, a plurality of cooling chambers 84 are provided in mold 19. Each of the cooling chambers 84 extends the entire height of mold 19 and is separated from the adjacent chambers by vertical partitions 85. Each chamber 84 has an inlet opening in lower flange 81 and an outlet opening in upper flange 80. Outer wall 83 of mold 19 may be made of any structurally strong metal such as steel or copper, as is known in the art. It is necessary for inner walls 82 to have a high heat conductivity, and for this reason copper is a preferred material of construction for these walls.

Figure 6:
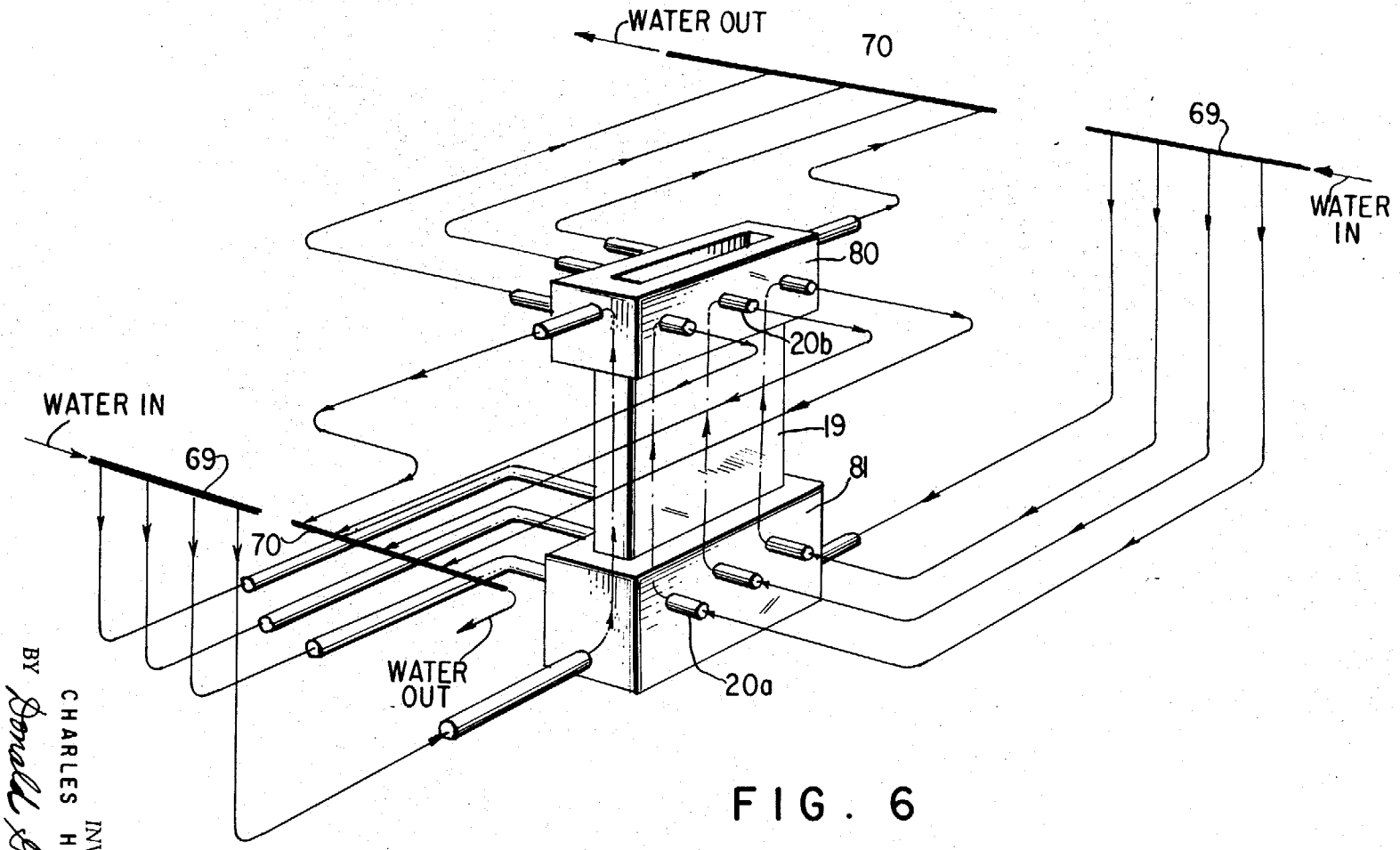
FIG. 6 is a diagrammatic perspective view showing the arrangement of fluid passages between the mounting and mold.

FIG. 6 shows a piping diagram of the water connections between the mold and the mold-support frame. As already explained, each of the two liquid-conducting portions 17 in the frame 16 is subdivided into inlet and outlet sections 69 and 70 respectively, the inlet sections being in communication with the lower mold flange 81 through inlet conduits 20a and the outlet sections being in communication with the upper mold flange 80 through outlet conduits 20b. It will be noted that cooling water passes from an inlet section 69 in one of the liquid-conducting portions through a chamber 84 in mold 19, thence to an outlet section 70 in the opposite liquid-conducting portion 17.

The apparatus is illustrated herein with the mold support frame 16 in metal-casting position on mold oscillator frame 10. Frame 16 is correctly positioned on frame 10 by cylindrical pins 90 projecting upwardly from corner plates 46a, 46b, 46c, and 46d at each corner thereof. These pins 90 are received in cylindrical bores 91 near the ends of tubes 66 in frame 16. The frame 16 is held in place by clamps 93 mounted on corner plates 46a, 46b, 46c, and 46d. Each clamp has an arm 94 which engages a flange 95 on tube 66, and a handle 96 having a cam surface 97 for moving clamping arms 94 between tight and loose positions.

To remove frame 16, cooling water is shut off at the stationary headers (not shown) which supply flexible hoses 15. Then handles 96 are raised to release frame 16. The mold 19 and frame 16 are then lifted off frame 10 by a crane. Eyebolts 98 may be provided to permit engagement by crane hooks. A new mold and mold-support frame are set in place on mold-oscillator frame 10, and secured by clamps 93. The apparatus is again ready for metal casting.

It will be seen that the novel mold-support frame and oscillator-frame structure of this invention permit changing of molds without the necessity of disconnecting the flexible hoses which supply cooling water to the mold. This saves a considerable amount of time.

Furthermore, in effect the mold-support frame 16 provides a means connected to the mold for supporting the latter and for supplying cooling liquid thereto. The upper portion 12 of the stationary frame portion, with its liquid-conducting portion 13 and hose connections 14, provide means for moving this first means up and down with the flexible hoses or conduits 15 supplying cooling liquid thereto. The first and second means are of course separable. The interfitting male and female members 21 and 22 provide self-acting make-and-break [points] *joints* disconnecting or reconnecting the cooling-liquid supply between the first and second means as required during their separation and replacement.

The mold-mounting structure of this invention permits rapid changing of molds simply by lifting one mold from the oscillator frame and placement of another mold thereon, without disconnection of any water hoses as was previously necessary. Substantial savings in labor are achieved and down time is held to a minimum.

Certain features of construction shown and described herein as incidental to my claimed invention, are not part thereof but are the invention of another and will be claimed in an application to be filed. These features include the means for supporting, actuating and guiding the mold oscillator frame 12. More specifically, they comprehend cams 36 and rollers engaged thereby, the motor 37 and shafting connecting it to the cams, the location and mounting of bearing rollers on frame 10, details and location of the guide-roller mechanisms 50, 50a, etc., springs 57 and their mounting on and [connecting] *connections* to frames 11 and 12, respectively.

What is claimed is:

1. A liquid-cooled continuous-casting mold and mounting means therefor comprising a mold-oscillator frame including liquid-conducting portions having hose connections, flexible hoses connected to said hose connections permitting oscillation of said frame, a mold-support frame having liquid-conducting portions separably supported by said mold-oscillator frame, the liquid-conducting portions of said two frames having mutually registering separable liquid connections forming a fluid-tight seal and permitting passage of a cooling medium therebetween, an open-ended tubular mold having cooling-water passages supported by said mold-support frame, and conduit means connecting said cooling-water passages with the liquid-conducting portions of said mold-supporting frame, said mold-oscillator frame including a stationary base and a vertically reciprocable upper portion, said vertically reciprocable upper portion including said liquid-conducting portions.

2. A liquid-cooled continuous-casting mold and mounting means therefor as defined by claim 1 characterized by said vertically reciprocable upper portion being a rectangle, and said liquid-conducting portions comprising a pair of metal tubes on opposite sides of said rectangle.

3. The mold and mounting means of claim 1 wherein said vertically reciprocable upper portion is a rectangle, and wherein said liquid-conducting portions comprise a pair of metal tubes on opposite sides of said rectangle.

4. A liquid-cooled continuous-casting mold and mounting means therefor comprising a mold-oscillator frame including a stationary base and a vertically reciprocable upper portion, said vertically reciprocable upper portion including liquid-conducting portions having hose connections, flexible hoses connected to said hose connections permitting oscillation of the upper portion of said oscillator frame, a mold-support frame separably supported on said oscillator frame, said mold-support frame including liquid-conducting portions located above the liquid-conducting portions of the mold-oscillator frame, said liquid-conducting portions of said two frames having mutually registering separable, liquid connections forming fluid-tight passage means between said liquid-conducting portions of said two frames, said mold supporting frame also including a supporting beam fixedly secured to said liquid-conducting portions in said mold-supporting frame, a vertical open-ended tubular mold having cooling-water passages fixedly supported on said supporting beam, and conduit means connecting said cooling-water passages with said liquid-conducting portions of said mold-support frame.

5. The continuous-casting mold and mounting means of claim 4 wherein said vertically reciprocable upper portion of said mold-oscillator frame is a rectangle, and wherein said liquid-conducting portions of said mold-oscillator frame and said mold-support frame each include a pair of tubes on opposite sides of said mold.

6. Apparatus for mounting a continuous-casting mold comprising a base, a horizontal open frame carried on said base, means guiding vertical reciprocating movement of said frame on said base, means providing separable upper and lower liquid-coolant passages extending along opposite sides of said frame, beams bridging said coolant-passage means, a mold within said frame secured to said beams, relatively permanent connections from said upper coolant-passage means to the mold, flexible coolant-liquid hose connected to said lower coolant-passage means, and self-acting make-and-break connections between said upper and lower coolant-passage means effecting a break when the upper coolant-passage means is raised from its normal position resting on said lower coolant-passage means.

*7. In a continuous-casting apparatus which includes a mold-oscillating frame, a mold-support frame supported on said mold-oscillating frame, an open-ended mold supported on said mold-support frame and having passages in its walls for circulating cooling liquid, and means for oscillating at least a portion of said mold-oscillating frame, said mold-support frame and said mold, the combination therewith of an improved construction for conducting cooling liquid into and out of said passages, said construction comprising liquid-conducting means on said mold-oscillating frame, cooperating liquid-conducting means on said mold-support frame and being connected with said passages, and quick-disconnect means affording communication between the liquid-conducting means on the two frames.*

*8. A combination as defined in claim 7 in which the liquid-conducting means on said mold-oscillating frame includes inlet and outlet manifolds, the liquid-conducting means on said mold-support frame includes inlet and outlet manifolds, and said quick-disconnect means provides registering openings in the respective manifolds.*

References Cited

The following references, cited by the Examiner, are of record in the patented file of this patent or the original patent.

UNITED STATES PATENTS

| | | | |
|---|---|---|---|
| 2,348,020 | 5/1944 | Norris | 164—76 X |
| 2,871,534 | 2/1959 | Wieland | 164—83 X |
| 3,066,364 | 12/1962 | Baier | 164—82 |
| 3,098,269 | 7/1963 | Baier | 164—283 |
| 3,313,006 | 4/1967 | Barbe et al. | 164—283 |

FOREIGN PATENTS

| | | |
|---|---|---|
| 1,069,045 | 2/1954 | France. |

R. SPENCER ANNEAR, Primary Examiner

U.S. Cl. X.R.

164—128, 260